July 24, 1956 J. S. DONAL, JR 2,756,392

AMPLITUDE MODULATION

Filed Jan. 11, 1952 3 Sheets-Sheet 1

INVENTOR
John S. Donal, Jr.
BY
Charles H. Brown
ATTORNEY

INVENTOR
John S. Donal, Jr.
BY
Charles H. Brown
ATTORNEY

July 24, 1956 J. S. DONAL, JR 2,756,392

AMPLITUDE MODULATION

Filed Jan. 11, 1952 3 Sheets-Sheet 3

INVENTOR
John S. Donal, Jr.
BY
Charles H. Brown
ATTORNEY

United States Patent Office 2,756,392

Patented July 24, 1956

2,756,392

AMPLITUDE MODULATION

John S. Donal, Jr., Princeton, N. J., assignor to Radio Corporation of America, a corporation of Delaware Application January 11, 1952, Serial No. 266,066

The terminal 15 years of the term of the patent to be granted has been disclaimed 3 Claims. (Cl. 332—48)

This invention relates to amplitude modulation, and more particularly to the amplitude modulation of oscillatory energy. The oscillatory energy being modulated may be of any frequency, but this invention is particularly suitable for modulating high frequency energy of the order of 1000 megacycles or higher, in accordance with signals. The modulation may represent voice or the like, facsimile or the like, video signals or sound.

This invention is particularly applicable to the amplitude modulation of magnetron oscillators. Such oscillators, as is well-known, are capable of providing considerable power at high radio frequencies.

One aspect of this invention relates to an absorption-tube amplitude modulation system such as that disclosed in my Patent #2,502,077, dated March 28, 1950. Systems of this type generally include a magnetron oscillator or other source of high radio frequency power the output of which is coupled to a load by means of a transmission line, and an absorption tube whose absorption is controlled by a modulating signal, also coupled to said line to absorb variable amounts of power therefrom. In this way, the load is variably "robbed" of power by the absorption tube, producing amplitude modulation of the radio frequency power in the load. Generally, as disclosed in said patent, the absorption tube in an amplitude modulation system of the type described is coupled to the main transmission line at a point between the source and the load, by means of a branch transmission line which is an odd number of quarter-wavelengths long, so that the impedance (e. g., the conductance) of the absorption tube itself is inverted at the point of intersection of the main and branch transmission lines. The impedance-inverting properties of quarter-wave transmission lines are well-known to those skilled in the art to which this invention relates.

With an arrangement of this type using a spiral-beam absorption tube such as described and claimed in my joint copending application Serial No. 757,755, filed June 28, 1947, now Patent #2,602,156, dated July 1, 1952, minimum electron beam current in the absorption tube means maximum conductance or minimum impedance at the junction point of the main and branch transmission lines and therefore minimum power in the load. However, even with the absorption tube beam off (zero electron beam current), certain losses occur in the cavity and glass of the absorption tube. In many cases, these losses in the absorption tube result in a conductance at the junction of the main and branch lines which is not sufficiently high to provide sufficient depth of modulation in the load (i. e., a sufficiently low power level in the load).

Therefore, an object of this invention is to devise an arrangement for increasing the depth of modulation obtainable in absorption tube amplitude modulation systems.

Another object is to increase the obtainable depth of modulation in an absorption tube modulation system without appreciably decreasing the obtainable peak level of the modulation.

Another aspect of this invention relates to an amplitude modulation system utilizing the electron coupler described in Cuccia Patent No. 2,542,797, dated February 20, 1951. In such a system, a spiral electron beam developed in the coupler is used to transfer ultra high frequency power from an input system to an output system. By modulation of the transit time of such a beam the power transfer may be controlled, thus providing amplitude modulation of the power in the output system.

The depth of modulation obtained with the spiral-beam electron coupler may oftentimes be insufficient for certain purposes, such as television video signals, due either to the method used for modulation or to the changes necessary in D. C. voltage for modulation of the coupler by variation of the beam transit time being too high.

A further object of this invention is therefore to devise an arrangement for increasing the depth of modulation obtainable in electron coupler modulation systems, without seriously decreasing the obtainable peak modulation level.

A still further object is to devise novel amplitude modulation arrangements utilizing electron couplers, wherein satisfactory depth of modulation is obtainable.

Still another object is to devise amplitude modulation arrangements utilizing electron couplers, wherein use is made of phase shifts produced in one or more electron coupler beams to provide amplitude modulation of the output.

The objects of this invention are accomplished, briefly, in the following manner: In the absorption tube modulation system of the invention a branch circuit of adjustable length abstracts power from the main transmission line and feeds it into the line at a point between the absorption tube and the load, with a phase relation of 180° to the power reaching this same point via the main line. In another embodiment of the invention the same type of branch circuit may be used in an amplitude modulation system in association with a controllable electron coupler arranged in shunt to the branch circuit but connected between a magnetron source and a load. In another embodiment a modified, variable-phase-shift type of electron coupler is used between the source and the load, in combination with a branch circuit of the type described, to provide an amplitude modulation system having very good depth of modulation. In still another modification, two electron couplers are utilized between the source and the load and at least one of these couplers is of the variable-phase-shift type; the outputs of these two couplers are combined in variable phase relation to supply the load and thus provide a complete range of amplitude modulation. In yet another modification, a single variable-phase-shift type electron coupler tube having two separate electron beams is inserted between an RF source and a load; the phase shifts effected by these two beams are caused to vary in opposite directions by the modulating signal and the output sides of these two coupling beams are combined in this way in variable phase relation to supply the load with amplitude modulated RF energy.

The foregoing and other objects of the invention will be best understood from the following descriptions of some exemplifications thereof, reference being had to the accompanying drawings, wherein.

Figure 1:
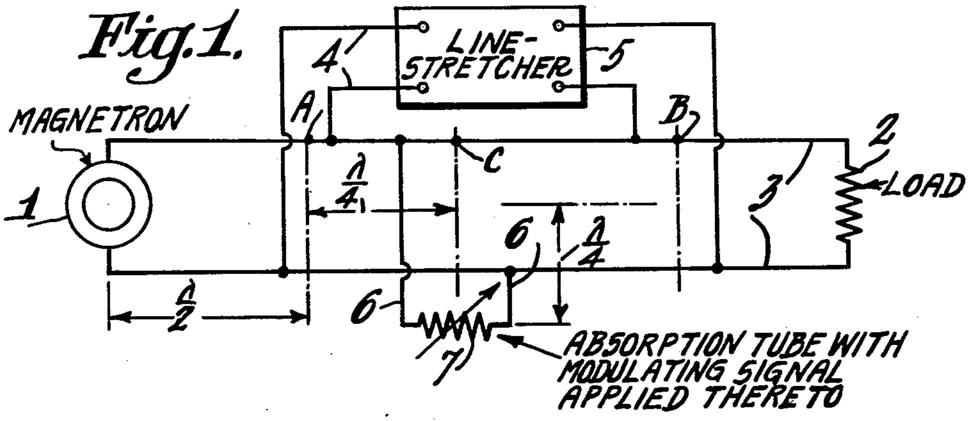
Fig. 1 is a schematic representation of an arrangement according to this invention, using an absorption tube.

Referring to Fig. 1, a magnetron oscillator 1 is electrically connected to a suitable load 2, represented as a resistance, by means of a main transmission line 3 which is represented as a pair of conductors, although it may be of the coaxial or waveguide type. The transmission line 3 is matched to the load 2, which may for example be a 50-ohm load. The load 2 may be an antenna, for example.

At junction point A, which point is spaced a distance of a half-wavelength or an integral number of half-wavelengths (at the mean operating frequency of the magnetron) along the main line 3 from the magnetron 1, one end of a branch transmission line 4 is connected to the main line. Branch line 4 includes an adjustable element 5 (commonly termed a "line-stretcher") therein, by means of which the effective electrical length of this branch line may be varied or adjusted. The opposite end of line 4 is coupled into main line 3 at a point B, which is located between point A and load 2.

At junction point C, which is spaced a distance of a quarter-wavelength or an odd number of quarter-wavelengths (at the magnetron operating frequency) from point A on the load side thereof along line 3, one end of an absorption branch transmission line 6 is connected to the main line. Point C is located between points A and B. Line 6 has a length equal to a quarter-wavelength or an odd number of quarter-wavelengths at the operating frequency of the magnetron. Branch line 6 is terminated by a spiral beam absorption tube which presents a conductance to line 6 which is represented in Fig. 1 by a variable resistance 7. Branch line 6 extends to the resonant circuit or cavity of a spiral electron beam tube, the beam of which is subjected to a strong magnetic field having an axis parallel to the axis of the spiralling beam. The oscillatory energy generated by magnetron 1 is coupled to this resonant circuit or cavity of the spiral beam tube and is absorbed in amounts depending upon the conductance of the spiral beam tube, which in turn is directly proportional to the beam current in such tube. The beam current in the spiral beam absorption tube is controlled by a modulating signal, which may be applied to the grid of such tube. In other words, the absorption tube consists essentially of a resonant cavity containing a grid-controlled modulating electron beam which is caused to describe a spiral path in such cavity. Such an absorption tube is more particularly described and claimed in my aforementioned copending joint application, and also in a paper by Donal and Bush, Proceedings I. R. E., vol. 37, April 1949, pp. 375–382. The resonant cavity of the absorption tube is coupled by a loop to branch line 6 and presents a conductance to this line represented by resistance 7.

The conductance at 7 can be made to be directly proportional to the beam current in the absorption tube, so that said conductance increases as the beam current increases. Maximum conductance at 7 means minimum conductance or maximum impedance at point C, and therefore maximum power in load 2, so that the load power varies in the same direction as the beam current and as the grid voltage of the absorption tube. Maximum impedance at point C for branch line 6 means of course that most of the magnetron power will go into load 2 rather than into the branch line 6. When the beam current in the absorption tube is zero, the conductance at 7 is quite low but is not zero, being limited by losses in the cavity and tube. This results in a low impedance at junction C, reducing the power in load 2 by short-circuiting a large portion of it. Thus, amplitude modulation is produced in load 2 by variation of the conductance at 7 as a result of a modulating voltage applied to the absorption tube grid.

However, losses in the absorption tube may result in an impedance at junction C which is not sufficiently low to give the required depth of modulation in the load. To overcome this limitation, the branch transmission line 4 is so positioned as to present a load in shunt with the magnetron 1. Power from the magnetron (which is a source of R. F. energy) flowing in this branch line 4 is fed into the line to the load at point B. The impedance of the branch 4 as seen at point A is such that the power in the branch reaching point B is equal to that reaching B by way of the main line when this latter power is a minimum (i. e., at the trough or low end of the modulation cycle). The phases of the two powers reaching B are adjusted, by means of the "line-stretcher" 5, to differ in phase by 180°, so that these two powers cancel each other in their effect on the load 2. Therefore, under these conditions the power reaching the load 2 is substantially zero and the depth of modulation is thus improved. In the analysis which follows, it will be shown that the presence of the branch line 4 (considered as a shunt load) in Fig. 1, which improves the depth of modulation, or provides an increased depth, has a negligible effect on the system at the maximum load power point or peak of the amplitude modulation cycle. In other words, there is no appreciable reduction in the maximum load power as compared to that obtainable without the branch line 4. Thus, the desired result is obtained without introducing any appreciable undesired effects.

The upper branch 4 of Fig. 1 forms a shunt load on the magnetron; this load is of the same nature as that treated in my aforementioned Patent No. 2,502,077 and reference may be made to Fig. 1 of such patent. Said patent will be referred to hereinafter as the shunt load patent."

It is desired that the power in this shunt load (line) be equal to that in the line 3 to the useful load 2, so that they may be made to cancel at point B. Equating $P_{SL}$ (the power in the shunt load) of Equation 12 of the shunt load patent to $P_L$ (the power in the useful load) of Equation 14 of said patent, we have $$\frac{1+a}{1+a(n+1)}=\frac{na^2}{(1+a)[1+a(n+1)]} \quad (1)$$

where $a$ and $n$ are constants, $a$ being the ratio of the absorption tube conductance to the useful load conductance and $n$ being the ratio of the useful load conductance to the shunt load conductance. Stated in another way, $n$ is the ratio of the shunt load resistance to the 50-ohm useful load resistance. The losses in the absorption tube are such that, with the electron beam of this tube off, $a$ has a value of about 0.04. From curve $P_L$ in Fig. 2 of the shunt load patent, it may be seen that with this value of $a$ the power in the useful load is reduced to about 20 watts per kilowatt of magnetron power into a matched load (a value on the vertical axis of 0.02). This is often not deep enough modulation; hence, the scheme of Fig. 1 may be utilized.

With $a=0.04$, Equation 1 above yields $n=678$.

As a check, Equation 12 of the shunt load patent can be combined with Equation 16 of said patent to give $$P_{SL}=P_{00}\left[\frac{1}{n}+\frac{a}{1+a}\right]^u\left[\frac{1+a}{1+a(n+1)}\right] \quad (2)$$

where $P_{00}$ is the magnetron power output into a matched load (assumed to be 1000 watts) and $u$ is an exponential factor found experimentally to have a value of 0.33 (see lines 33–34, column 6 of the shunt load patent). For $a=0.04$ and $n=678$, Equation 2 above yield $P_{SL}=12.8$ watts.

Combining Equations 14 and 16 of the shunt load patent, $$P_L=P_{00}\left[\frac{1}{n}+\frac{a}{1+a}\right]^u\left[\frac{na^2}{(1+a)[1+a(n+1)]}\right] \quad (3)$$

For the same values of $P_{00}$, $n$ and $a$, Equation 3 above gives 12.8 watts for $P_L$. Thus, with the proper line lengths, these equal powers $P_L$ and $P_{SL}$ can be made to have a phase difference of 180° at point B so that they cancel thereat to give greatly improved depth of modulation, giving in effect substantially zero power in the load at the trough of the amplitude modulation cycle.

Figures 2, 4:
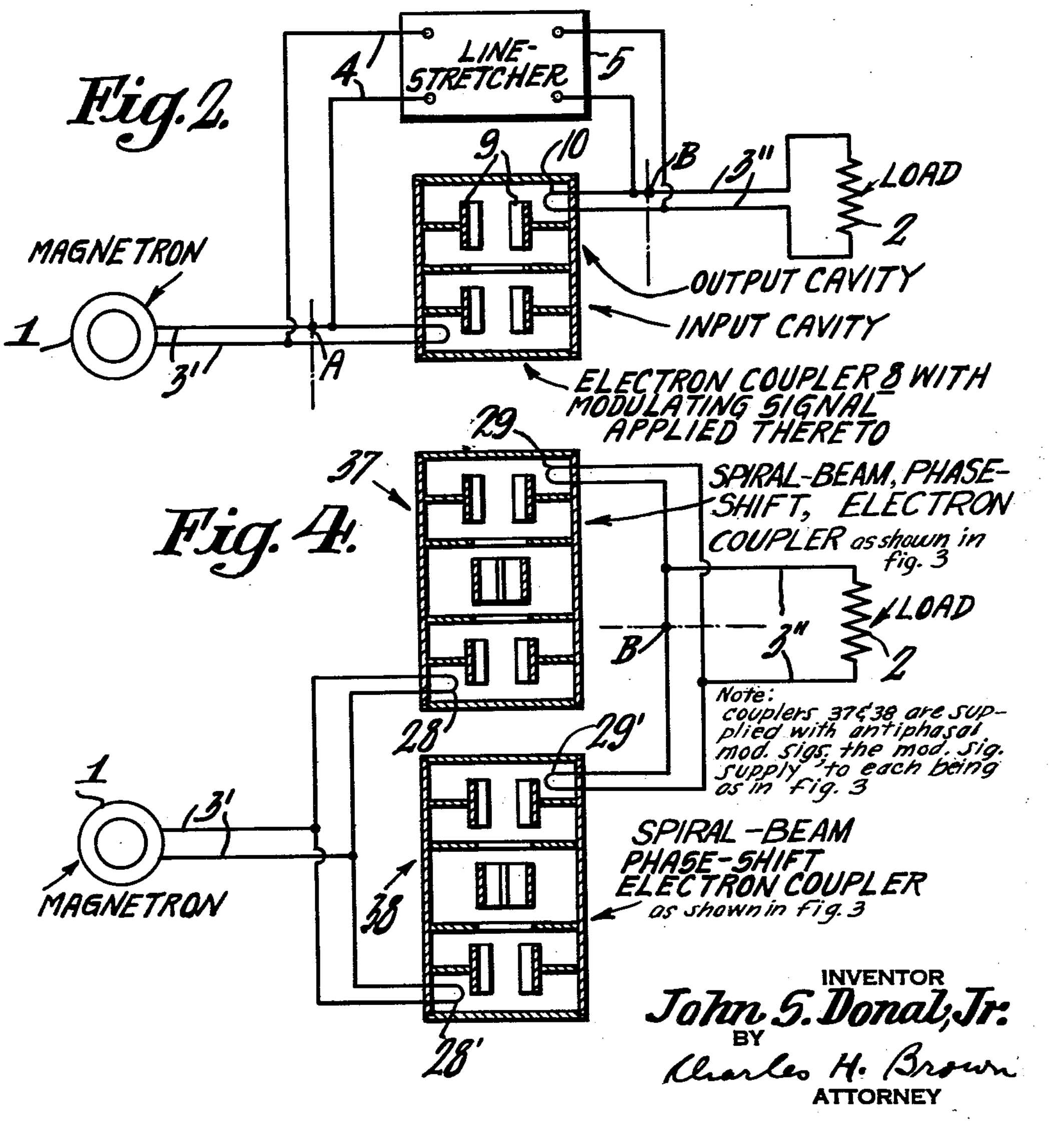
Fig. 2 is a modification of Fig. 1, using an electron coupler.
Fig. 4 is a schematic representation of an out-phase modulation system using electron couplers.

As regards maximum powers, however, or powers at the peak of the modulation cycle in the load, let it be assumed that $a$ can increase to 1.8, the maximum value illustrated in Fig. 2 of the shunt load patent. Equation 2 above now gives 1.98 watts as the power in the shunt load. This means (as compared to the previous shunt load power of 12.8 watts) that the shunt load takes less power at the peak of the amplitude modulation cycle than at the trough of such cycle, even though, of course, its conductance is fixed. Equation 3 above now gives 554.5 watts as the power in the useful load.

The useful load power of 554.5 watts, at the peak of the modulation cycle, must be compared to that without the shunt branch 4, 5. To do this, Equations 19 and 20 of the shunt load patent can be combined to give the following expression for $P_L$:

$$P_L=P_{00}\left[\frac{a}{1+a}\right]^u\left[\frac{a}{1+a}\right] \quad (4)$$

For the same value of $a=1.8$, $P_L$ from Equation 4 is 555.6 watts. This means that, while the minimum power in the load 2 of Fig. 1 is decreased to substantially zero at the trough of the modulation cycle by the action of the shunt branch 4, 5, thus improving the depth of modulation, the maximum power is so little affected by the presence of the shunt branch that the equations give substantially no difference for the useful load power in the two cases (i. e., with the shunt branch and without the shunt branch). That is, the shunt branch takes so very little power that its effect is hardly noticeable.

It is interesting that the conductance presented by the main line 3 of Fig. 1 at the trough of the amplitude modulation cycle can be had from the second unnumbered equation in column 6 of the shunt load patent. $G'_{JLL}$ (the conductance presented by main line 3 at point A, looking toward the load) is $$\left(\frac{a}{1+a}\right)G_L \quad (5)$$

and since we are assuming a 50-ohm load ($G_L=.02$), $G'_{JLL}$ is found to be 0.00077 mhos, since $a=0.04$. The shunt load conductance is $G_L/n$, so that the shunt load presents a conductance of .02/678 or 0.00003 mhos. Thus, about 25 times (.00077/.00003) the power in the shunt branch will go down the main line. The absorption tube presents a conductance $G_{JM}$ at the junction C of $Yo^2/G_M$ or $Yo^2/aG_L$, where $Yo$ is the characteristic admittance of the line and is equal to $G_L$ (since the line is matched to the load) and $G_M$ is the conductance of absorption tube 7. $G_{JM}$ is therefore $(0.02)^2/.0008$ or 0.5 mhos. But the useful load presents only 0.02 mhos, so that only about 1/25 (0.02/0.5) of the power in the main line goes to the useful load, or just enough to balance out the roughly 1/25 of the power going to the "shunt load" branch.

The branch 4, 5 forms a shunt load on the magnetron which is similar in effect to that described in my shunt load patent; such a shunt load tends to improve both the magnetron spectrum and the system bandwidth by preventing undue decoupling of the magnetron from its load, as fully described in said patent.

A coupling arrangement having directional properties should be used at point B, for coupling the branch line into the main line, in order to prevent the flowing of power in undesired directions, such as from point B to point A via the branch line 4, for example. The branch line 4 at point B and the main line 3 at the same point can be considered to be two oscillatory sources, since both lines carry oscillatory energy; these oscillatory sources are to be coupled to the same load 2. Thus, the problem becomes the same as coupling two oscillators to a common load. A coupling arrangement which can be used to couple two oscillators to a common load, and which can be used at point B in Fig. 1, is a bridge-type diplexer of the type disclosed in the copending Brown application, Serial No. 52,635, filed October 4, 1948. Said Brown application ripened on July 8, 1952, into Patent No. 2,602,887. However, it is desired to be pointed out that since such a diplexer operates in an optimum manner only when the two oscillatory powers supplied to the load are substantially equal, such diplexer would operate in Fig. 1 with reduced efficiency over a portion of the amplitude modulation cycle, particularly near the peaks of the modulation cycle. In this connection, note that in Fig. 1 the power is varied only in the absorption-tube branch and there is no phase variation; the branch line 4, 5 constitutes what is commonly called a "passive element."

At the low end, trough or valley of the amplitude modulation cycle the two powers at point B are made to be equal; this is done, as previously explained, for the purpose of providing cancellation and improved depth of modulation in the load. Since at this point the two powers at B (the two powers into the diplexer) are equal, the diplexer would then work quite efficiently.

At the high end or peak of the amplitude modulation cycle the two powers at point B are quite unequal (in the numerical example previously given, these powers are 1.98 watts in the shunt branch and 554.5 watts in the useful load), so that the diplexer would work rather inefficiently at this point. However, the diplexer referred to is given merely by way of example as an arrangement that could be used at point B; the principle of the invention is in no way concerned with the particular coupling used at this point.

The magnetron 1 may be of the multicavity type disclosed in Hansell Patent No. 2,217,745, dated October 15, 1940. The transmission line 3 would then be connected to a probe, loop, or other coupling element coupled to the interior of one of the resonant cavities, which may be thought of as being also cavity resonators.

At this juncture, it is desired to be pointed out that the change in efficiency of the magnetron produced as a result of the modulation contributes favorably to the depth of modulation obtained in Fig. 1. The junction point C, at which the absorption tube is coupled to the transmission line, is spaced an odd number of quarter-wavelengths from the magnetron 1. Therefore, impedances at point C are inverted at the magnetron. When the beam current in the absorption tube 7 is zero, substantially an open-circuit is provided at 7, and substantially a short-circuit at junction C. This results in a very low conductance (a very high resistance) at the magnetron 1, open-circuiting the magnetron and thereby reducing its efficiency. When the magnetron efficiency is reduced, its power output is of course reduced, thus reducing the load power by this effect in addition to the short-circuiting of the load by the absorption tube. The change in magnetron efficiency is therefore in a direction to improve the depth of modulation obtainable.

It is possible to provent decoupling of the magnetron oscillator from its load in another way, in addition to the fact that the branch 4, 5 forms a shunt load and prevents undue decoupling of the oscillator from said load.

A second spiral-beam absorption tube may be connected to the main line at the junction point A, the grids of the two absorption tubes being supplied 180° out-of-phase by the modulating voltage in order to keep the magnetron load constant. The second absorption tube would be in effect connected in the same manner as a shunt load, and it would be turned on to absorb and throw away power when the main absorption tube is turned off to form a short-circuit on the useful load; in this connection, it will be remembered that the useful load power varies in the same direction as the beam current in the (first) absorption tube. As a result of this two-absorption-tube action, the load on the magnetron is constant and there is therefore no frequency change during the modulation cycle.

To give an example of an arrangement using two absorption tubes, suppose that a second absorption tube is connected to point A by a transmission line a half-wave-length long, and suppose that the grid voltage in this second tube is varied 180° out-of-phase with that of the first tube, and over such a range that the resistance afforded by the second tube varies from substantially infinity at one end of the amplitude modulation cycle to approximately 50 ohms at the other end of such cycle. At one end of the modulation cycle, the beam in absorption tube 7 is turned on, to produce substantially a short-circuit thereat or an open-circuit at point C. At this time, the beam in the second absorption tube is off, producing a resistance of substantially infinity at the point where this second tube is connected to the main transmission line. At this time, then, since there is an open circuit at point C looking toward the first absorption tube and a resistance of substantially infinity at the point where the second absorption tube is connected to the main line, looking toward such second tube, the magnetron sees the 50-ohm resistance of the load 2. At the other end of the amplitude modulation cycle, the beam in absorption tube 7 is turned off, to produce substantially an open circuit thereat or a short circuit at point C, resulting in an open circuit (looking toward the load) at point A a quarter-wave-length away. At this time, the beam in the second absorption tube is on, producing a resistance of substantially 50 ohms at the point where this second tube is connected to the main transmission line.

At this time, then, the magnetron again sees a 50-ohm resistance, the resistance in this case being that afforded by the second absorption tube. Therefore, it may be seen that, using this arrangement of two absorption tubes, the load on the magnetron will be substantially constant during the amplitude modulation cycle.

However, in the two-absorption-tube arrangement the depth of modulation could be less favorable, since in this arrangement the load on the magnetron is substantially constant and its efficiency is therefore not decreased during the amplitude modulation cycle.

In the aforementioned Cuccia patent there is described a spiral beam electron coupler device for amplitude modulating and transferring microwave energy from an oscillator to a load circuit. Such an electron coupler is schematically illustrated at 8 in Fig. 2, to which reference will now be made. In this device an electron beam generated by an electron gun is projected along a constant magnetic field and through a transverse uniform microwave electric field, such as that set up between a pair of deflection plates in an input cavity, connected to the magnetron source 1 of microwave energy by transmission line 3′ and by a coupling loop in the input cavity. The strength of the magnetic field is adjusted to a value such that the so-called "cyclotron frequency" of an electron in said field (which depends upon H, the strength of the magnetic field) is equal to the angular frequency of the microwave energy applied to the input cavity deflection plates.

Under these conditions, as the electron beam passes through the transverse oscillating electric field it absorbs energy therefrom, all of the electrons revolving around the longitudinal axis of the device in synchronism with the electric field and traversing spiral paths having radii proportional (but not directly proportional) to the energy absorbed from the electric field, and having axial velocities proportional (but not directly proportional) to the axial electron beam accelerating potential. Since they have the same angular and axial velocities, all the spirally traveling electrons in the beam lie at any instant on the linear directrix of a cone, and the envelope of the rotating beam is a cone. Hence, the beam is sometimes termed a "rotating pencil" beam. When the electrons emerge from the electric field and continue in the constant magnetic field the path of each electron becomes a helix of constant radius, since the centrifugal force due to the energy acquired from the electric field is balanced by the focusing effect of the magnetic field, and the rotating beam becomes a cylinder-directrix pencil beam with a cylindrical envelope.

The rotating pencil beam in device 8 is then projected through an output system, which may be a pair of flat plates 9 similar to the input plates and connected to a load circuit resonant at the operating frequency, which resonant circuit is indicated as an output cavity in Fig. 2. As the electrons revolve around the axis of rotation of the beam they induce microwave potentials on the output plates 9 and thus deliver energy thereto at the operating frequency. As energy is abstracted from the beam the radii of the electron paths are reduced as a function of energy abstraction, because of the focusing effect of the magnetic field, and hence the electrons traverse spiral paths of decreasing radii, the beam envelope being conical. After delivering energy to the output system, the beam is collected by a collector electrode. The energy delivered to the output system is abstracted by a coupling loop 10 in the output cavity and applied to a transmission line section 3″ opposite ends of which are coupled to said loop and to the useful load 2, which may be an antenna.

The accelerating potentials applied to the electron beam in coupler 8 may be varied by modulation signals or control potentials in order to vary the energy of the beam and thus control the effective microwave coupling between input and output circuits 3′ and 3″ of Fig. 2. More particularly, the voltage (i. e., the D.C. potential) on the output cavity may be varied by a modulating signal, to change the transit time of the beam in the output cavity and thus modulate or vary the energy transferred from the input microwave circuit 3′ to the output microwave circuit 3″. This action is somewhat more fully explained in an article entitled "The Electron Coupler," Electronics, March 1950, pages 80–85. Alternatively, extra electron absorption beams may be provided in the output cavity of the coupler to control the energy reaching the output circuit by control of the absorption of the microwave energy in the output cavity; the grid voltage of the guns which provide these extra beams may be varied or modulated by a modulating signal to modulate or vary the energy transferred from the input microwave circuit 3′ to the output microwave circuit 3″.

The depth of modulation obtained with a spiral-beam electron coupler of the type described may be not as great as required, due either to the method used for its modulation or to the fact that the necessary changes in D. C. voltage for modulating the coupler might be too high. It will be appreciated that in Fig. 2, since the energy transferred from the input microwave circuit 3′ (supplied from the magnetron) to the output microwave circuit 3″ (leading to the load) is varied in response to a modulating signal, the microwave energy appearing in load 2 is amplitude modulated by this same modulating signal.

In order to increase the depth of modulation in the electron coupler arrangement, a branch transmission line 4 and line-stretcher 5 are utilized in Fig. 2 in a similar way to the like-numbered parts in Fig. 1, being connected between points A and B. Point A is located on input transmission line 3′ and point B is located on output transmission line 3″. Power in the branch 4, 5 is again caused (as in Fig. 1), by the "line-stretcher" 5, to reach point B 180° out of phase with the power reaching this point via the main line (including line 3′, coupler 8 and line 3″), thus reducing the attainable minimum power in the load. This increases the depth of modulation obtainable.

Modulation of the transit time of the beam in the output cavity, in order to produce amplitude modulation of the power in the load, does not change the input impedance of the electron coupler 8. In other words, no reaction back to the input cavity is produced and the driving generator 1 sees a constant impedance at all times. The coupler is thus assumed to maintain a substantially constant load on the magnetron and hence the power in the branch 4, 5 is constant, similarly to the conditions existing when two absorption tubes are used in the described modification of the Fig. 1 arrangement. Similarly, modulation of absorption beams in the output cavity does not change the input impedance of the coupler.

In Fig. 2 a diplexer such as that suggested in connection with Fig. 1 could be used at point B. In Fig. 2 the power is varied only in the electron coupler branch including coupler 8. There is no phase variation; the shunt branch line 4, 5 constitutes what is commonly called a "passive element." At the low end or valley of the amplitude modulation cycle the two powers at point B are made to be equal; this is done for the purpose of providing improved depth of modulation in the load. Since at this point the two powers at B (the two powers into the diplexer) are equal, the diplexer would work satisfactorily at this point. At the peak of the modulation cycle the two powers at point B are quite unequal, so that the diplexer would work rather inefficiently at this point.

Instead of using a diplexer of the type mentioned at point B in Fig. 1 and at point B in Fig. 2, the power might be combined at these points by means of a network such as that commonly called a "magic-T."

Figure 3:
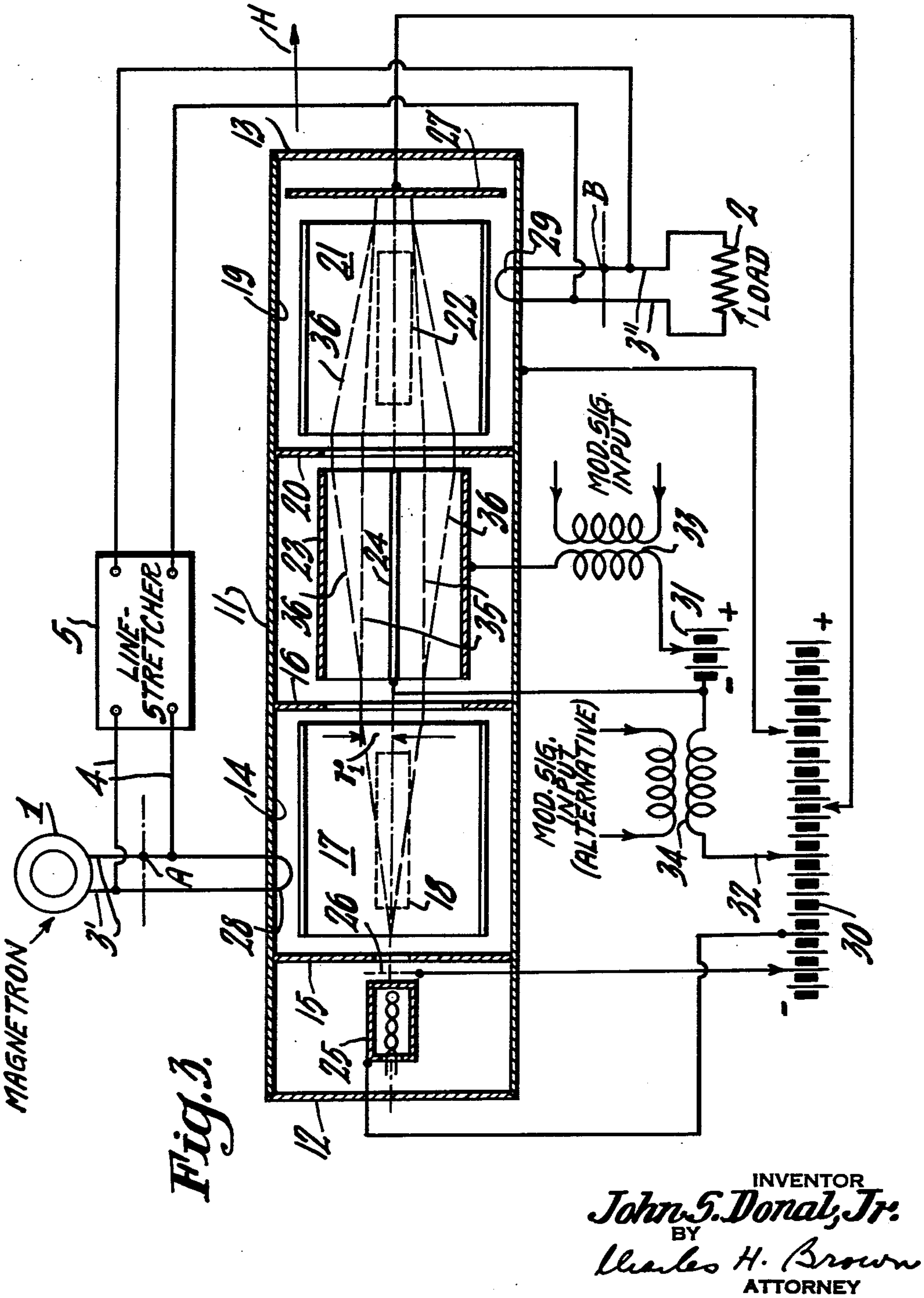
Fig. 3 is a modification of Fig. 2, using a modified electron coupler.

Some of the methods proposed in the aforementioned Cuccia patent for the modulation of the output of an electron coupler may require a modulating voltage which, while low, is susceptible of further decrease. Fig. 3 discloses a modification of Fig. 2 in which the power output of a modified type of electron coupler is combined at point B with a substantially equal power flowing in a branch line and in which the sum of the impedances of the main and branch lines, as seen at point A, is such as to properly load the magnetron. This is effected by varying the phase of the RF voltage at the output of the modified electron coupler, so that the two RF voltages to be combined at point B are in variable phase. The phase of the RF voltage at the output of the electron coupler of Fig. 3 is varied in response to the modulating signal. When the phase difference is zero at point B, the two powers add in the load; when it is 180° the two powers subtract in the load and yield good depth of modulation.

Now referring to Fig. 3, basically, a cylinder-rod electrode system is used in an electron coupler between the input and output cavities thereof and the principle of phase shift is that which results when amplification or de-amplification takes place. A modified electron coupler of this type and construction, used for amplification, is described and claimed in my Patent #2,565,357, dated August 21, 1951. This patent will be hereinafter referred to as my "amplifying electron coupler" patent.

The electron coupler (unmodified) and the way in which it operates have been previously described in connection with Fig. 2. Broadly, the modified electron coupler operates in the following way: The electron beam emerging from the input cavity of the electron coupler, and possessing spiral energy (it is a "rotating pencil" beam in which the electrons in the beam lie at any instant on the linear directrix of a cone), is projected through a radial electric field to change the radius of rotation of the electrons, thus changing their angular velocities and causing them to lag or lead other electrons which do not have their radius of rotation changed. This lag or lead is equivalent to a phase shift.

In Fig. 3, a cylindrical metallic envelope 11 is closed at each end by plates 12 and 13 to complete an evacuated enclosure. One end of the envelope 11 provides an input cavity resonator 14 which is completed by apertured end plates (apertured for the electron beam) 15 and 16 serving as shields. A pair of flat or arcuate input pole faces (here illustrated as arcuate) 17 are mounted by supports 18 in opposed relation coaxially within the resonator 14. The other end of the envelope 11 provides an output cavity resonator 19 which is bounded by plate 13 at one end and at its other end by an apertured plate (apertured for the electron beam) 20 also serving as a shield. A pair of flat or arcuate output pole faces (here illustrated as arcuate) 21 are mounted by supports 22 in opposed relation coaxially within the resonator 19. If desired (atlhough this is not shown in the drawing) the output pole faces 21 may be disposed at right angles to the input pole faces 17, to reduce undesired coupling between input and output cavities.

A hollow cylinder 23 is mounted coaxially in the space between the input and output systems. A cylindrical rod 24 is mounted concentrically with the cylinder 23. The mountings of the cylinder and rod may be, for example, as illustrated in Figs. 8–10 of my amplifying electron coupler patent.

An electron beam gun is provided to send a beam of electrons from left to right through input resonator 14, this gun including an electron-emissive cathode 25 heated by a suitable heater schematically illustrated. Grid 26 adjacent cathode 25 may be used to control the electron beam current. The electron beam passes through the following elements in succession: grid 26, plate 15, input cavity resonator 14 (also between pole faces 17 therein), plate 16, the space between rod 24 and cylinder 23, plate 20, and output cavity resonator 19 (also between pole faces 21 therein); the beam contributes its energy in variable phase to the output cavity 19 and energy remaining in the beam is dissipated at the collector 27, mounted in any suitable manner adjacent that end of pole faces 21 opposite to cathode 25. The electron beam is projected along the axis of the tube through the two resonators 14 and 19 and the radial field region 23—24. The shields 16 and 20 prevent penetration of the radial field into the input and output cavities. The input resonator 14 is provided with an input coupling loop 28 arranged for coupling with the electromagnetic field adjacent one of the gaps between the pole faces 17 and connected to the end of main transmission line section 3′ opposite to that to which magnetron 1 is connected. Junction point A, at which point branch line 4 is connected, is located between magnetron 1 and loop 28. Similarly, a coupling loop 29 is provided in the output resonator 19, arranged for coupling with the electromagnetic field adjacent one of the gaps between the pole faces 21 and connected to the end of main transmission line 3″ opposite to that to which load 2 is connected. Junction point B, to which point the line from line-stretcher 5 is connected, is located between load 2 and loop 29. Lines 3′, 3″, 4, etc. may be coaxial. A constant magnetic field H is established along the central axis by suitable means (not shown). Thus, the tube is quite similar in construction, though not in operation, to that described in Figs. 8–10 of my amplifying electron coupler patent.

In the operation of the device of Fig. 3 as a spiral-beam variable-phase-shift electron coupler, suitable operating potentials are applied to the cathode 25, grid 26, rod 24, cylinder 23, collector 27 and envelope 11, by means of batteries 30 and 31. Thus, the resonator 14, plates 17, resonator 19, plates 21, and envelope 11 are all at the same potential, while the bias potentials of cylinder 23 and rod 24 may be different from each other, as controlled by battery 31, in order that the modulating signal can be applied in one direction only. The cylinder and rod are separately biased from the rest of the structure by means of a tap 32 on battery 30. Cathode 25 is at a negative potential with respect to most of the other potentials but at a positive potential with respect to that on grid 26.

Modulating signal voltage is impressed between the cylinder 23 and rod 24 by means of the coupling coil 33. Alternatively, modulating signal voltage can be applied to both the rod 24 and cylinder 23, with respect to the other tube elements, by means of the coupling coil 34. In operation, a radio frequency electric field is set up between the two plates 17 by oscillator 1, which electric field, together with the axial magnetic field, causes the electrons from cathode 25 to execute spiral paths of increasing radii, extracting energy from said electric field, as described above in connection with Fig. 2. If no means is provided for changing the phase of the beam, the rotating electron beam will pass on between the output plates 21 and give up the energy absorbed from the input electric field to the electric field induced between the output plates, with a particular predetermined phase. In order to vary the phase of the beam, thus varying the phase relation between the R. F. input at 28 and the R. F. output at 29, a radially-directed electric field is established between input plates 17 and output plates 21, by means of cylinder 23 and coaxial rod 24.

The radial electric field, if in the proper direction, tends to continuously accelerate the electrons in the beam outwardly toward the outer cylinder 23. Under ideal conditions, with abrupt discontinuities in the electric fields between the various regions, the path of each electron from the cathode 25 would be linear along a horizontal axis to the plates 17, spiral between these plates, helical in the space between the plates 17 and the cylinder 23 and rod 24, an increasing (or decreasing) spiral (or similar) within the cylinder 23, helical about a new axis parallel to and spaced from the central axis between the cylinder 23 and the plates 21, a decreasing spiral about the new axis between the output plates 21, and then (if all the spiral energy has been absorbed) a straight line along the new axis to the collector 27.

The fourth equation from the top of column 6 of my amplifying electron coupler patent states that $$\omega=\frac{\omega_c}{c}\left(1+\frac{r_1^2}{r^2}\right) \quad (6)$$

where $\omega$ is the angular velocity about the original axis, $\omega_c$ is the cyclotron angular velocity, $r_1$ is the radius of rotation at which the electrons enter the (radial) system of electrodes 23—24 and $r$ is the radius at any time under consideration. From Equation 6, the angular velocity $\omega$ varies from the cyclotron angular velocity $\omega_c$ when $r$ differs from $r_1$. When $r$ is equal to $r_1$, $\omega=\omega_c$ and the angular velocity is unchanged. If $r$ becomes infinite, $\omega$ approaches $\omega_c/2$ or approaches the classical Larmor frequency, which is equal to $\omega_c/2$. As the beam radius $r$ increases, the angular velocity $\omega$ decreases. Thus, if the potential between rod 24 and cylinder 23 is such as to expand the electron paths (increasing $r$), the angular velocity decreases and, with respect to the original axis, the electrons lag behind electrons which do not have their value of $r$ changed. This is the clue to the phase shift effected by the device of Fig. 3. If the electrodes 23—24 in Fig. 3 expand the paths of the electrons, these electrons will be out of phase with electrons not so expanded.

It should be pointed out that, if the electrons leave the radial field while their paths are expanding, there is a phase shift in addition to that arising from a lag in angular displacement about the original axis. This additional phase shift is produced in the following manner. While these electrons are still increasing their radii about the original axis, their paths are not tangent to a circle about the original axis, but, at the instant of leaving the radial field their directions are necessarily tangent to a circle about the new axis of rotation. The new axis is displaced in such a manner that the changed-radius electrons start rotation with respect to this axis with a phase lag in addition to the phase lag that they have with respect to the original axis.

The magnitude of the phase shift will now be considered. Suppose that the electron reaches a maximum radius $r$ which is very large compared to the entering radius $r_1$. In this case $\omega$ will have fallen to approximately $\omega_c/2$ when the electron reaches the radius $r$ (the last term of Equation 6 then being substantially zero). If $\omega$ had had a value of $\omega_c/2$ all the time, and if an unexpanded electron would have rotated through 360°, the electron would have lagged 180° but the average $\omega$ is greater than this value so the electron will have lagged less than 180°. The phase delay will be reduced still more, of course, if $r$ is only a few times $r_1$.

The electron can be left in the (radial) system of electrodes, however. After one complete rotation the $\omega$ will have returned to $\omega_c$ (since $r$ then equals $r_1$) but the phase will be delayed a greater amount due to the reduced value of $\omega$ during most of the cycle. Thus, depending upon the radial field and the time spent in this field, the phase delay can be adjusted to the desired value, or it can be modulated by a modulating signal suitably applied. The adjustment or variation of phase delay can be made by varying the radial field between electrodes 23 and 24 and so changing the integrated variation of $\omega$ from $\omega_c$ (varying the radial field changes the value of $r$), or by keeping the radial field constant and varying the transit time within the radial field.

To vary the radial field between electrodes 23 and 24 in accordance with a modulating signal, to thereby vary the phase delay between input loop 28 and output loop 29 in accordance with such signal, the modulating signal is applied to coil 33 one end of which is connected to cylinder 23 and the other end of which is connected (through bias battery 31) to rod 24. The rod 24 and cylinder 23 are biased with respect to each other so that the modulating signal to vary the phase shift may operate in the required direction after application of signal at 33.

For transit time phase modulation, rather than radial field phase modulation as in the preceding paragraph, the modulating signal is applied to coil 34 one end of which is connected to both the cylinder and the rod and the other end of which is connected to bias tap 32. In this way, the potential of the rod plus cylinder is varied with respect to the other tube elements at modulation rate, to thereby vary the transit time within the radial field at this rate and also the phase delay between the input and output loops at modulation rate.

In Fig. 3, the relative phase of the voltage in the output loop 29 is varied or modulated in response to a modulating signal which varies the voltages applied to one or both of the electrodes 23 and 24, in the above-described manner; the relative phase of the voltage at point B, due to energy reaching point B via the so-called "passive" branch line 4, 5 is of course not varied. The arrangement is so adjusted that at the low end of the modulation cycle the powers reaching point B over the two separate paths result in voltages which are 180° out of phase, combining vectorially in the load 2 to give substantially zero net load power and yielding good depth of modulation. The amplitudes of these two powers are arranged to be substantially equal to each other. The electrons from the gun including cathode 25 are caused to spiral in input cavity 14 and enter the radial field between rod 24 and cylinder 23 on some radius $r_1$. The modulating signal is applied to one or both of these electrodes via 33 or 34 to cause $r$ to be either equal to or greater than $r_1$. It is assumed that what might be called the "zero condition" of the spiral-beam phase-shift electron coupler occurs at the low end of the modulation cycle. At this point, the modulating voltage applied to the rod-cylinder arrangement would be zero and $r$ would be equal to $r_1$. The envelope of the modulated beam would then be approximately as shown by the dashline 35 and there would then be no change, in the radial field space, of radius $r$ from the value $r_1$, giving no phase shift in the spiral-beam phase-shift-coupler from input loop 28 to output loop 29. At this "zero condition" the arrangement is adjusted in such a way that the two voltages at point B are 180° out of phase; this "zero condition" adjustment can be made in any well-known manner. The potential provided between rod 24 and cylinder 23 by battery 31 would be adjusted to a value such that at the low end of the modulation cycle there would be no net voltage between the rod and cylinder and $r$ would be equal to $r_1$, giving the "zero envelope" 35.

As we proceed toward the high end of the modulation cycle, the modulating voltage applied to the rod-cylinder arrangement is such as to make $r$ greater than $r_1$ in the radial field space, expanding the path of the electron stream to make its phase lag. The limiting condition would be at the high end or peak of the modulation cycle, at which the modulating voltage applied to the rod-cylinder arrangement would be a maximum and at which the envelope of the modulated beam would be approximately as shown by the dashed line 36. There would then be a maximum phase shift (in the illustration, this would be a phase lag) in the spiral-beam phase-shift-coupler from input loop 28 to output loop 29 and at this point the two voltages at B would have a phase difference of zero. The powers then would combine in the load 2 to give maximum (high) net load power at the peak of the modulation cycle.

Since the beam current in the tube of Fig. 3 is constant, the input impedance of this tube does not change during the modulation cycle and so the driving generator 1 sees a constant impedance at all times, since of course the impedance of the "passive" branch 4, 5 does not change. The increase in radius of rotation of the electrons, with a consequent phase shift as described above, is accompanied by an increase in R. F. energy delivered to the loop 29, as described in my amplifying electron coupler patent. This effect causes the power delivered to the load by the coupler to be greater than that delivered by the passive branch 4, 5. At the top of the modulation cycle, when the voltages supplied at B by the two branches are in phase, the total power in the load is of course greater than that supplied by the magnetron, since some D. C. energy is converted to R. F. energy by the process of amplification in the electron coupler. The final effect is merely one of a change in the variation of the power in the load, as a function of modulating voltage, from the variation which would obtain if no amplification took place in the coupler. The main variations of power in the load result from the phase variations or phase shifts described above.

We will again assume, but merely for purposes of illustration, that a bridge-type diplexer of the type previously referred to is used at point B, to couple the two powers. At the low end of the modulation cycle, the two voltages at B are 180° out of phase, combining vectorially to give zero power in the antenna or load 2. The diplexer works efficiently at this point, since the two input (oscillator) powers applied thereto are then equal in amplitude. At the high end of the modulation cycle, the two voltages at B are in phase but their amplitudes are unequal due to the amplification in the electron coupler. For this reason the diplexer then works with a somewhat decreased efficiency.

However, even though a constant load is presented to the magnetron, a characteristic resulting from the operation of Fig. 3 may be undesirable in some cases. The two voltages at point B are combined vectorially in the load. One of these voltages (that resulting from power flowing in the electron coupler branch) is varied from a phase of 180° relative to the other (at the bottom or trough of the modulation cycle) to a phase of zero degrees relative to the other (at the peak of the modulation cycle). The vectorial resultant of these two voltages, giving the power in the load, therefore varies through a phase angle of ninety electrical degrees during the amplitude modulation cycle. In other words, there is a residual phase modulation in the load of ±45°, which may be undesirable in certain types of service.

A geometrical point in connection with Fig. 3 should be clarified. After leaving the radial field between electrodes 23 and 24 the electrons go back to cyclotron angular velocity ($\omega_c$) but depending upon the electron direction on entering the radial field, the new axis of rotation is displaced from the original axis if $r$ is changed as the electrons go through the radial field. Therefore, the separation of the output pole faces 21 must be increased. In this connection, reference may be had if desired to Fig. 4 of my amplifying electron coupler patent previously referred to. In addition, if the electrons leave the radial field in a direction not tangent to a circle with its center on the geometrical axis of the original beam, their paths may expand slightly farther than those of Fig. 4 of the aforesaid patent and the electrons will not pass close to the center of the output cavity. However, this would not be a basic drawback.

In the Fig. 3 arrangement as described, the phase and, to some extent, the amplitude of the R. F. energy reaching output loop 29 is varied in response to a modulating signal. However, it is possible in Fig. 3 to vary the amplitude in an additional manner in order to make the diplexer work more efficiently or to adjust the shape of the modulation characteristic. This possibility will now be considered. As in Fig. 2 previously described, the voltage on the output cavity 19 in Fig. 3 could also be varied by the modulating signal, thus changing the transit time of the beam in such cavity and modulating the amplitude of the energy transferred from the input microwave loop 28 to the output microwave loop 29; alternatively, as suggested previously in connection with Fig. 2, extra absorption beams in the output cavity could also be modulated by the modulating signal, thus modulating the amplitude of the energy transferred from the input loop 28 to the output loop 29. Amplitude variation could be effected by one or more of these methods, in addition to the phase variation resulting from the modulation of rod and cylinder voltages in Fig. 3 as previously described. The above described increase in R. F. energy reaching the loop 29, due to amplification, could be cancelled out by adjustment of the absorption beams, or of the transit time, in the output cavity 19. At the top of the modulation cycle the two powers reaching the diplexer at B would then again be equal and the diplexer would work most efficiently. It is a matter of choice, whether a loss of efficiency in the diplexer is accepted, or whether the energy, converted from the D. C. source in the process of amplification, is reabsorbed in the output cavity of the coupler. Neither of the methods of amplitude modulation in the output cavity changes the beam current in the coupler, so that the input impedance of the electron coupler is not changed and a constant load is provided on the magnetron.

Fig. 4 illustrates a modification of the Fig. 3 arrangement, by means of which residual phase modulation in the load may be eliminated. In Fig. 4, two spiral-beam phase-shift electron couplers 37 and 38, which are preferably both exactly similar in construction to the electron coupler in Fig. 3, are connected in parallel so as to load a magnetron; their output powers are combined and supplied to load 2. More particularly, the input coupling loop 28 of coupler 37 and the input coupling loop 28' of coupler 38 are both coupled by separate subsidiary transmission lines to the main transmission line 3' from the magnetron, while the output coupling loop 29 of coupler 37 and the output coupling loop 29' of coupler 38 are both coupled by other separate subsidiary transmission lines to the main transmission line 3'' leading to the load 2.

Referring again to Equation 6, as the beam radius $r$ increases the angular velocity $\omega$ decreases, causing the electrons which thus have their paths expanded to lag behind electrons which do not have their value of $r$ changed. Conversely, as the beam radius $r$ decreases, the angular velocity $\omega$ increases, causing the electrons which thus have their paths contracted to advance ahead of electrons which do not have their value of $r$ changed. In Fig. 4, suppose that the two electron streams (in the two tubes 37 and 38) are originally in phase, adding their powers in the load 2. This would correspond to the peak or high end of the amplitude modulation cycle. Now let one stream, say the stream in tube 37, be expanded to make its phase lag and the other stream (in tube 38) be contracted to advance its phase. The phases of these streams are varied by suitable voltages applied to the cylinder and rod structures, exactly as in Fig. 3 previously described. The tube 37 is thus phase modulated from zero to minus 90° and tube 38 is thus phase modulated from zero to plus 90°. The 90° points for the two tubes correspond to the low end or valley of the amplitude modulation cycle, at which time the two voltages combined in the load are 180° out of phase, giving zero net energy in the load.

Electrons in coupler tube 37 are made to enter the radial field therein with a small radius and to have this radius increased by the radial field, decreasing $\omega$ (refer to Equation 6) and retarding the phase. The action in this tube is thus exactly similar to the action in the tube of Fig. 3.

Electrons in coupler tube 38 should be made to enter the radial field therein with a large radius and to have this radius decreased by the radial field, increasing $\omega$ (refer to Equation 6) and advancing the phase. Since the electrons in tube 38 enter the radial field with a radius larger than the corresponding radius for the electrons in tube 37, the energy per electron in the beam of tube 38 is greater when it enters the radial field than is the energy per electron of the beam of tube 37. The total energy can be adjusted by adjusting one or both of the beam currents by means of the respective grids, of course. Thus, one beam can enter its radial field with small energy and be amplified, the other with large energy and have the energy extracted. The criterion is that when the two beams are varied so that the voltages they induce are out of phase at point B, the voltage induced by each beam in the respective coupler output cavity should vary in amplitude the same amount from the undisturbed phase (the in-phase condition) and the energy in each beam should be equal.

Now consider an example. For convenience, make the energies in the two beams equal when the two outputs are in phase at point B, adjusting the beam current of one to do this, since they have different radii $r_1$ and therefore different energies. Now impose a modulation-signal-responsive radial field on the beam in tube 37 which draws the electrons radially outward, and a field on the beam in tube 38 which draws the electrons radially inward. The first beam lags or retards in phase but increases its energy due to amplification. The other beam advances in phase and is reduced in energy due to deamplification. The amplification and deamplification result from the action described in my aforementioned amplifying electron coupler patent. A portion of the modulating signal can be applied to the grid of the first gun (corresponding to the beam which increases its energy during modulation) to reduce this beam's total energy as one proceeds from the high end of the modulation cycle, when the two outputs are in phase, to the low end of the modulation cycle, when the two outputs are 180° out of phase. A portion of the modulating signal can be applied to the grid of 38, as well, to increase the energy delivered by this beam, to completely or partially overcome the deamplification. The final R. F. energies induced by the beams are thus adjusted in amplitude in such a way that there is no net phase shift in the vectorially-combined resultant power in the load.

In Fig. 4, there is substantially a constant load on the magnetron during the modulation cycle; in addition to the fact that changes in the radial fields in the couplers responsive to modulating signals do not appreciably affect the input impedances of the couplers, any change in loading on the magnetron due to changes in energy levels of the beams would be small due to the fact that the current of one beam is increased while that of the other is decreased, during the modulation cycle.

To summarize the operation of Fig. 4, wherein two spiral-beam phase-shift electron couplers phase modulated in opposite directions are utilized between the magnetron and the load, there is substantially a constant load on the magnetron and there is no residual phase modulation in the load, due to the adjustment of the two beam currents to maintain the amplitudes of the two powers equal at the low end of the modulation cycle, as well as at the high end thereof. Also, since the energies or amplitudes of the two powers are equal both at the high and low ends of the modulation cycle, the two inputs to the diplexer at point B (assuming a diplexer is utilized at this point) are of equal amplitudes and the diplexer works at maximum efficiency throughout the modulation cycle.

It is possible, in Fig. 4, to amplitude modulate one or both the powers appearing at point B, in addition to the phase modulation of these powers. The amplitude modulation could be effected by suitable adjustment of the respective tube beam currents by means of their grids. In this way, the modulation characteristic can be made as linear as desired.

In Fig. 4, the couplers, being one-way or unilateral power transfer or control devices, isolate the magnetron 1 from effects of varying power in the junction B and in the load.

If desired, phase shift might be effected in only one of the electron couplers of Fig. 4, in response to a modulating signal. In this case, only one of the couplers, say 37, needs to be of the modified or phase-shift type illustrated in Fig. 3; the other coupler 38 could be of the ordinary type as described in the aforementioned Cuccia patent. The modulating signal in this case would be applied to only the phase-shift coupler 37. In this modification, the two powers at point B can be adjusted for equality at the low end of the modulation cycle and the diplexer works at maximum efficiency at this point, since the two inputs thereto are then equal in amplitude. Due to amplification or deamplification, depending on whether the phase is retarded or advanced by the coupler 37, the two powers would not be equal at the high end of the modulation cycle, so that the diplexer would work less efficiently at this point. There would be a constant load on the magnetron during the amplitude modulation cycle in this case, since no variation of input impedance of the couplers occurs. However, as in Fig. 3, since the phase shift in only one branch is varied in this suggested modification, there would result a residual phase modulation of plus or minus 45° in the load power, which is the combination of the two powers appearing at junction point B.

Figure 5:
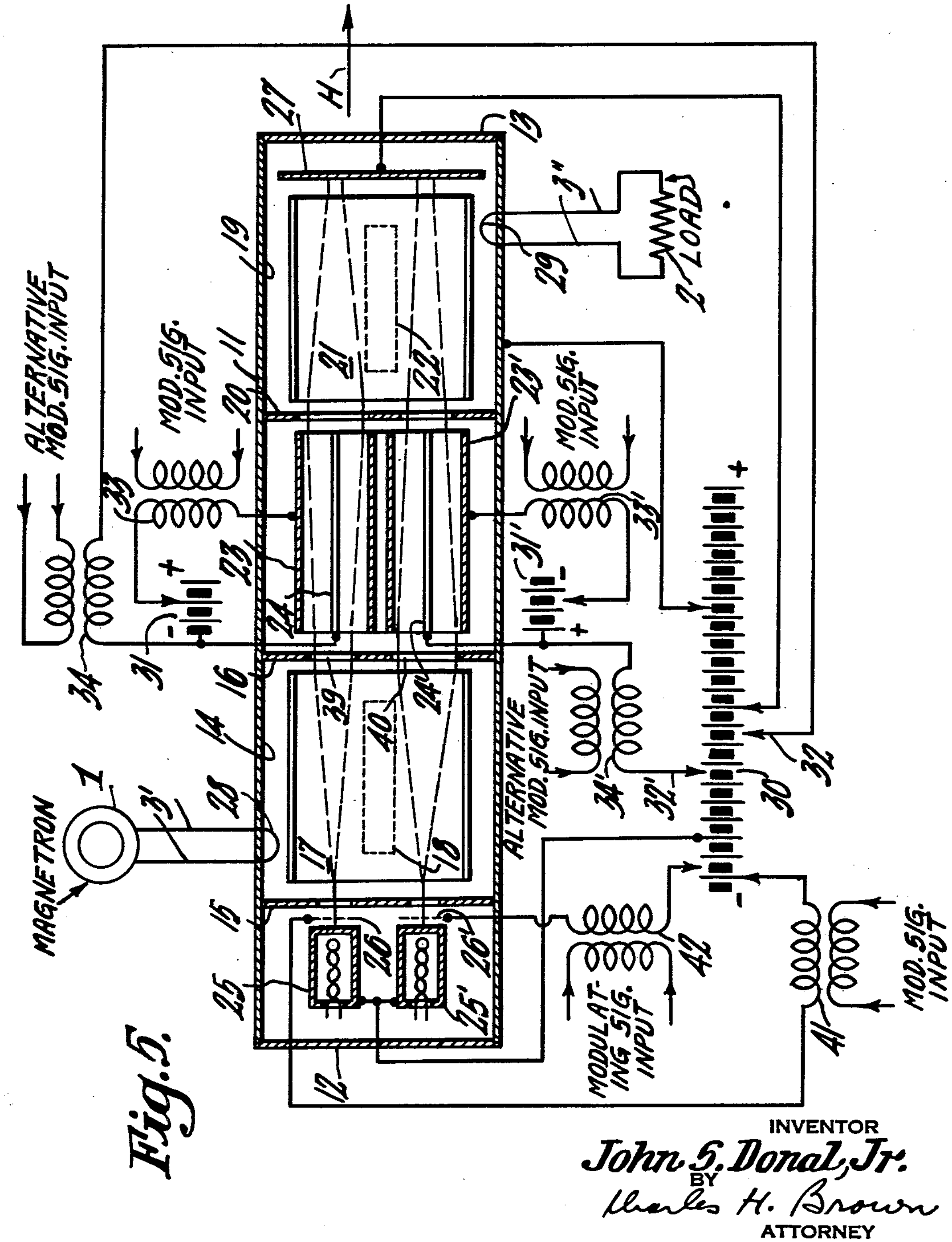
Fig. 5 is a modification of Fig. 4.

Fig. 5 discloses a modification of Fig. 4 in which the two spiral-beam phase-shift electron couplers of the latter arrangement are combined in a single envelope, thus obviating the necessity for a diplexer or other type of directional power-combining device at a junction such as B in Fig. 4. In Fig. 5, parts the same as those of Fig. 3 are denoted by the same reference numerals, the corresponding parts for one of the two beams bearing primed numerals.

Basically, the structural arrangement of Fig. 5 is quite similar to that of Fig. 3, except that in Fig. 5 two separate grid-controlled electron beams are produced in the same envelope by means of two separate electron guns, and in Fig. 5 two rod-cylinder electrode systems are provided for separately controlling the phase shifts effected by the two beams.

Now referring more in detail to Fig. 5, a pair of input pole faces 17 are mounted by supports 18 in opposing relation coaxially within the resonator 14. Although pole faces 17 are illustrated as arcuate, this has been done only in order to simplify the drawing; actually, these pole faces have a shape other than arcuate in order to effect an action to be described hereinafter. Plates 15, 16 and 20 are each provided with two apertures to allow for passage of two separate electron beams therethrough.

Hollow cylinder 23 is mounted so that its axis is parallel to but spaced from the central longitudinal axis of the device, in the space between the input and output systems. A cylindrical rod 24 is mounted concentrically with the cylinder 23 and preferably also concentrically with the upper aperture 39 in plate 16. A second hollow cylinder 23′ is mounted so that its axis is parallel to but spaced from the central longitudinal axis of the device, in the space between the input and output systems. A cylindrical rod 24′ is mounted concentrically with the cylinder 23′ and preferably also concentrically with the lower aperture 40 in plate 16.

A first electron beam gun is provided to send a beam of electrons from left to right through resonator 14 and through aperture 39, this gun including an electron-emissive cathode 25 heated by a suitable heater schematically illustrated. Grid 26 adjacent cathode 25 may be used to control the electron beam current therefrom. The first electron beam passes through the following elements in succession: grid 26, plate 15 (utilizing the upper aperture therein), input cavity resonator 14 (between pole faces 17 therein), plate 16 (utilizing the upper aperture 39), the space between rod 24 and cylinder 23, plate 20 (utilizing the upper aperture therein), and output cavity resonator 19 (between pole faces 21 therein). This first or upper beam contributes its energy in variable phase to the output cavity 19 and energy remaining in the beam is dissipated at collector 27. This first beam is thus projected through the upper part of the tube envelope, through the two resonators 14 and 19 and the radial field region 23—24. The shields or screens 16 and 20 prevent penetration of the radial field into the input and output cavities.

A second electron beam gun is provided to send a beam of electrons from left to right through resonator 14 and through aperture 40, this gun including an electron-emissive cathode 25′ heated by a suitable heater schematically illustrated. Grid 26′ adjacent cathode 25′ may be used to control the electron beam current therefrom. The second electron beam passes through the following elements in succession: grid 26′, plate 15 (utilizing the lower aperture therein), input cavity resonator 14 (between pole faces 17 therein), plate 16 (utilizing the lower aperture 40), the space between rod 24′ and cylinder 23′, plate 20 (utilizing the lower aperture therein), and output resonator 19 (between pole faces 21 therein). This second or lower beam contributes its energy in variable phase to the cavity 19 and energy remaining in the beam is dissipated at collector 27. This second beam is thus projected through the lower part of the tube envelope, through the two resonators 14 and 19 and the radial field region 23′—24′.

In the operation of the device of Fig. 5 as a spiral-beam variable-phase-shift electron coupler, to provide two separately-controllable phase shifts, suitable operating potentials are applied to cathodes 25 and 25′ (these cathodes are illustrated as being at the same potential), grid 26, grid 26′, rod 24, cylinder 23, rod 24′, cylinder 23′, collector 27 and envelope 11, by means of batteries 30, 31 and 31′. The resonator 14, plates 17, resonator 19, plates 21 and envelope 11 are all at the same potential, which is positive with respect to the potential of the two cathodes. The potentials of cylinder 23 and rod 24 may be different from each other, as controlled by battery 31, in order that the modulating signal can be applied in one direction only; similarly, the potentials of cylinder 23′ and rod 24′ may be different from each other, as controlled by battery 31′. The cylinder 23 and rod 24 are separately biased from the rest of the structure by means of a tap 32 on battery 30; cylinder 23′ and rod 24′ are separately biased from the rest of the structure by means of tap 32′ on the same battery. Cathodes 25 and 25′ are held at a negative potential with respect to most of the other potentials but at a positive potential with respect to those on grids 26 and 26′.

Modulating signal voltage is impressed between cylinder 23 and rod 24 by means of the coupling coil 33. Likewise, modulating signal voltage is impressed between cylinder 23′ and rod 24′ by means of the coupling coil 33′. Alternatively, modulating signal voltage can be applied to both the rod 24 and cylinder 23, with respect to the other tube elements, by means of the coupling coil 34, and to both rod 24′ and cylinder 23′, with respect to the other tube elements, by coupling coil 34′.

In operation, a radio frequency or microwave electric field is set up between the two plates 17 by oscillator 1, which electric field, together with the axial magnetic field H, causes the electrons of each separate beam (from the two separate cathodes 25 and 25′) to execute spiral paths of increasing radii, extracting energy from said electric field, as described above in connection with Fig. 2. The pole faces 17 are shaped differently with respect to one beam than with respect to the other beam, causing the electric field to be applied differently to one beam than to the other. This means that the spiral paths of the two beams will be of different radii as the electrons leave the pole faces 17; in Fig. 5 the upper beam's spiral path is illustrated as being of smaller radius than the lower beam's spiral path.

The radial fields acting on the two electron beams are arranged to produce opposite effects on the two beams during the amplitude modulation cycle. The polarities of batteries 31 and 31′, which bias each respective rod with respect to its corresponding cylinder, are so arranged that the modulating signals to vary the phase shift operate in the required direction after application of modulating signal at 33 and 33′. In Fig. 5, suppose that the two electron streams are originally in phase, adding their powers in output cavity 19 and in load 2. This is the peak of the amplitude modulation cycle. The radial modulation-controlled fields are such that one stream, the upper one, is expanded between rod 24 and cylinder 23 to make its phase lag and the lower stream is contracted between rod 24′ and cylinder 23′ to advance its phase. Then, in the output cavity 19, the phase of one induced voltage will advance and that of the other will retard. This produces what may be termed "outphase" modulation of the power in the load 2, giving, for a phase difference of 180° in the two induced voltages, substantially zero output in the load, which corresponds to the trough or low end of the amplitude modulation cycle.

The phase advancement or retardation of the two induced voltages is produced by variation of the radial field voltages, in the same manner as previously explained in connection with Figs. 3 and 4.

Electrons in the upper part of the Fig. 5 coupler are made to enter the radial field between electrodes 23 and 24 with a small radius and to have this radius increased by the radial field, decreasing $\omega$ and retarding the phase. Electrons in the lower part of the Fig. 5 coupler are made to enter the radial field between electrodes 23′ and 24′ with a large radius and to have this radius decreased by the radial field, increasing $\omega$ and advancing the phase. This means that the energy per electron in the lower beam is greater when it enters the radial field than that of the upper beam. As in Fig. 4, the total energy can be adjusted by adjusting the beam current. The criterion is that when the two beams are varied so that the induced voltages are out of phase in the output loop 29, each induced voltage should vary in amplitude the same amount from the undisturbed phase (the in-phase condition) and the energy in each beam should be equal.

For convenience, make the energies in the two beams equal when the two outputs are in phase at loop 29, adjusting the beam current of one (by means of the potential on grid 26 or that on grid 26') to do this, since they have different radii and therefore different energies. Now impose a modulation-signal-responsive radial field on the upper beam to draw the electrons radially outward, and a radial field on the lower beam to draw the electrons radially inward. The upper beam lags or retards in phase but increases its energy due to amplification. The lower beam advances in phase and is reduced in energy due to deamplification. A portion of the modulating signal can be applied to the grid 26 by means of a coil 41 to reduce this beam's total energy as one proceeds from the high end of the modulation cycle to the low end of the modulation cycle. The final RF energy induced by this upper beam is thus reduced in amplitude in such a way that there is no net phase shift in the vectorially-combined resultant power in the loop 29. Alternatively, a portion of the modulating signal can be applied to the grid 26' by means of a coil 42 to increase this beam's total energy as one proceeds from the high end of the modulation cycle to the low end thereof, thus increasing in amplitude the final AF energy induced by this lower beam, resulting in no net phase shift in the vectorially-combined resultant power in loop 29. Also, portions of the modulating signal can be applied to both grids 26 and 26', as described above in connection with Fig. 4.

To vary the radial field between electrodes 23 and 24, and also to vary the radial field between electrodes 23' and 24' (the variation of these two fields being in opposite directions, as previously discussed, in order to vary the phase shifts of the upper and lower beams oppositely in accordance with a modulating signal), the modulating signal is applied to coil 33 one end of which is connected to cylinder 23 and the other end of which is connected to rod 24, and also to coil 33' one end of which is connected to cylinder 23' and the other end of which is connected to rod 24'. The rods and cylinders are biased with respect to each other so that the modulating signals to vary the phase shifts may operate in the required directions after application of signals at 33 and 33'. 25 is the cathode for the upper beam which has the radius of rotation of its electrons increased in the phase-shift section (radial-field section) by a positive potential on cylinder 23 with respect to rod 24. 25' is the cathode for the lower beam which has the radius of rotation of its electrons decreased in the phase-shift section by a positive potential on the rod 24' with respect to cylinder 23'.

For transit time phase modulation, rather than radial field phase modulation as in the preceding paragraph, the modulating signal is applied to coil 34 one end of which is connected to both cylinder 23 and rod 24 and the other end of which is connected to bias tap 32, and is also applied to coil 34' one end of which is connected to both cylinder 23' and rod 24' and the other end of which is connected to bias tap 32'. In this way, the potential of the rod plus cylinder 23—24 and the potential of the rod plus cylinder 23'—24' are varied in opposite directions at modulation rate with respect to the other tube elements, to thereby vary the transit times within the radial fields at this rate and also the phase shifts of the two beams, between the input and output loops, at modulation rate.

The system of Fig. 5 has essentially the same end-result characteristics as does the system of Fig. 4, with the added advantage that in Fig. 5 no diplexer is required. We will assume modulation of the beam currents by means of modulating signal applied to grid 26 and/or grid 26', in order to eliminate the changes in amplitude resulting from the amplification or deamplification inherently produced by radial changes of electron paths in the radial-field sections 23, 24 and 23', 24'. Then, since the phase of one beam is advanced while that of the other beam is retarded and since there will be no amplitude variation, during the modulation cycle, of the voltages induced by each beam separately in the pole faces 21, the sum vector in the output loop 29 will have no phase modulation, a very important desideratum. Also, there is a substantially constant load on the magnetron.

In Fig. 5, as in Fig. 4, it is possible to amplitude modulate one or both the powers induced in the output cavity, in addition to the phase modulation of these powers. The amplitude modulation could be effected by suitable adjustment of the respective beam currents by means of the corresponding grids. In this way, the modulation characteristic can be made as linear as desired.

From all of the above, it can be seen that by means of the various arrangements of this invention, the desired deep, linear modulation can be accomplished.

What is claimed is:

1. In an amplitude modulation system, a source of radio frequency power, a transmission line coupled between said source and a load, a spiral-beam electron coupler having input and output cavities coupled by an electron beam, means coupling said input cavity into said line, means coupling said output cavity into said line, means for varying in response to a modulating signal the phase shift produced by said beam between said input and output cavities, and power-transferring means connected across said coupler to abstract power from said line at a location between said source and the input cavity of said coupler and to feed it back with a desired phase into said line at a location between the output cavity of said coupler and said load.

2. In an amplitude modulation system, a source of radio frequency power, a transmission line coupled between said source and a load, a spiral-beam electron coupler having input and output cavities coupled by an electron beam, means coupling said input cavity into said line, means coupling said output cavity into said line, means for varying in response to a modulating signal the phase shift produced by said beam between said input and output cavities, and power-transferring means connected across said coupler to abstract power from said line at a location between said source and the input cavity of said coupler and to feed it back with a desired phase into said line at a location between the output cavity of said coupler and said load, said power-transferring means including a device responsive to the modulating signal for varying the relative phase of the power fed back into said line in dependence upon such modulating signal.

3. In an amplitude modulation system, a source of radio frequency power, a transmission line coupled between said source and a load, a first spiral-beam electron coupler having input and output cavities coupled by an electron beam, means coupling said input cavity into said line, means coupling said output cavity into said line, means for varying in response to a modulating signal the phase shift produced by said beam between said input and output cavities, and power-transferring means connected across said coupler to abstract power from said line at a location between said source and the input cavity of said coupler and to feed it back with a desired phase into said line at a location between the output cavity of said coupler and said load, said power-transferring means including a second spiral-beam electron coupler having input and output cavities coupled by an electron beam, means coupling the input and output cavities of said second coupler respectively to the input and output cavities of said first coupler, and means for varying in response to a modulating signal the phase shift produced by the beam of said second coupler between the input and output cavities thereof, thereby to vary the relative phase of the power fed back into said line in dependence upon such modulating signal.

References Cited in the file of this patent

UNITED STATES PATENTS

| | | |
|---|---|---|
| 2,301,160 | Finch | Nov. 3, 1942 |
| 2,433,442 | Dodds et al. | Dec. 30, 1947 |
| 2,447,543 | Smullin | Aug. 24, 1948 |
| 2,498,059 | Albersheim | Feb. 21, 1950 |
| 2,511,120 | Muller | June 13, 1950 |
| 2,542,797 | Cuccia | Feb. 20, 1951 |
| 2,565,410 | Tiley | Aug. 21, 1951 |
| 2,602,156 | Donal et al. | July 1, 1952 |